(12) United States Patent
Mizukoshi et al.

(10) Patent No.: US 7,710,682 B2
(45) Date of Patent: May 4, 2010

(54) METHOD AND APPARATUS FOR WRITING SPIRAL SERVO PATTERN IN A DISK DRIVE

(75) Inventors: Seiji Mizukoshi, Nishitama-gun (JP); Masahide Yatsu, Akishima (JP); Hideo Sado, Ome (JP); Katsuki Ueda, Tachikawa (JP); Toshitaka Matsunaga, Ome (JP); Shinichirou Kouhara, Hino (JP); Shouji Nakajima, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 239 days.

(21) Appl. No.: 11/942,389

(22) Filed: Nov. 19, 2007

(65) Prior Publication Data

US 2008/0151409 A1 Jun. 26, 2008

(30) Foreign Application Priority Data

Dec. 26, 2006 (JP) ............................. 2006-350015

(51) Int. Cl.
*G11B 21/02* (2006.01)
(52) U.S. Cl. ....................................................... 360/75
(58) Field of Classification Search ........................ None
See application file for complete search history.

(56) References Cited

U.S. PATENT DOCUMENTS

| 5,668,679 | A | | 9/1997 | Swearingen et al. |
|---|---|---|---|---|
| 5,901,003 | A | | 5/1999 | Chainer et al. |
| 7,209,312 | B1 | * | 4/2007 | Sutardja ................. 360/77.07 |
| 7,471,481 | B2 | * | 12/2008 | Lau et al. ....................... 360/75 |
| 7,522,370 | B1 | * | 4/2009 | Sutardja ................. 360/77.07 |
| 7,561,359 | B1 | * | 7/2009 | Jeong et al. ................... 360/48 |
| 2006/0056099 | A1 | | 3/2006 | Hashimoto et al. |
| 2006/0103967 | A1 | | 5/2006 | Kim et al. |
| 2007/0263311 | A1 | * | 11/2007 | Smith ........................ 360/75 |
| 2009/0067084 | A1 | * | 3/2009 | Lau et al. ....................... 360/75 |

* cited by examiner

*Primary Examiner*—William J Klimowicz
*Assistant Examiner*—James L Habermehl
(74) *Attorney, Agent, or Firm*—Pillsbury Winthrop Shaw Pittman, LLP (57) ABSTRACT

According to one embodiment, there is to provide a servo write method of writing a multi-spiral servo pattern to a disk medium, the method including a process of writing a spiral index pattern to the disk medium, the spiral index pattern being a spiral pattern including the same region as that of a servo burst signal included in the spiral servo pattern and a region that allows the spiral index pattern to be distinguished from the spiral servo pattern, the spiral index pattern being used as a reference for a write start.

6 Claims, 7 Drawing Sheets

METHOD AND APPARATUS FOR WRITING SPIRAL SERVO PATTERN IN A DISK DRIVE

CROSS-REFERENCE TO RELATED APPLICATIONS

This application is based upon and claims the benefit of priority from Japanese Patent Application No. 2006-350015, filed Dec. 26, 2006, the entire contents of which are incorporated herein by reference.

BACKGROUND

1. Field

One embodiment of the present invention relates to a disk drive, and in particular, to a servo write technique for spiral servo patterns.

2. Description of the Related Art

In general, in disk drives typified by hard disk drives, servo patterns (servo data) used for head positioning control are recorded on a disk medium that is a data recording medium. The disk drive uses the servo patterns read by the head to controllably place the head at a target position (target track) on the disk medium.

The servo patterns recorded on the disk medium have a plurality of servo sectors normally arranged circumferentially at a fixed interval so as to constitute concentric servo tracks. The disk drive positions the head on the basis of the servo patterns and uses the head to record user data on the disk medium to construct concentric data tracks.

The servo patterns are recorded on the disk medium by a servo write Block included in a disk drive manufacturing process. A proposal has been made of a method of recording a plurality of spiral servo patterns (hereinafter referred to as spiral servo patterns) constituting base patterns (seed patterns) on the disk medium during the servo write Block (see, for example, U.S. Pat. No. 5,668,679).

In the servo write Block in accordance with the proposed method, a plurality of spiral servo patterns (multi-spiral servo patterns) are recorded, by, for example, a dedicated servo track writer (STW), on the disk medium not incorporated yet in a disk drive to be shipped as a product. Alternatively, a head in the drive itself records the spiral servo patterns.

The disk medium is subsequently incorporated into the disk drive, which performs a servo self-write method to write concentric servo patterns (hereinafter referred to as specified servo patterns for convenience) used for the product to the disk medium. The specified servo patterns constitute the concentric servo tracks.

When the spiral servo patterns are written to the disk medium, a clock track is written to the disk medium to determine a timing at which an operation of writing the spiral servo patterns is started. The clock track is a concentric track pattern written to the boundary of a data storage region which is located on the innermost periphery of the disk medium, by pressing a head of the servo track writer against an inner peripheral stopper.

The head is separated into a read head made of a GMR element and a write head, both of which are mounted on a slider. This results in a deviation called an offset between a position where the read head reads data from the disk medium and a position where the write head writes data to the disk medium.

When an operation of writing the spiral servo patterns to the disk medium is started, the read head reads the clock track to generate a write timing for the spiral servo patterns. In this case, the offset makes it difficult to allow the read head to read the clock track from the position where the write head has written the clock track.

Thus, before the operation of writing the spiral servo patterns to the disk medium, a process needs to be executed which searches the disk medium for a position where the read head can read all of the clock track. The searching process needs to be executed every time one multi-spiral servo pattern is written to the disk medium. Therefore, the searching process requires a relatively long time, reducing the efficiency of the process of writing the spiral servo patterns to the disk medium.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION OF THE INVENTION

Various embodiments according to the invention will be described hereinafter with reference to the accompanying drawings. In general, according to one embodiment of the invention, there is to provide a servo write method that enables a reduction in processing time required to detect a reference pattern that determines a write start timing for spiral servo patterns.

First Embodiment

Configuration of the Disk Drive

Figure 1:
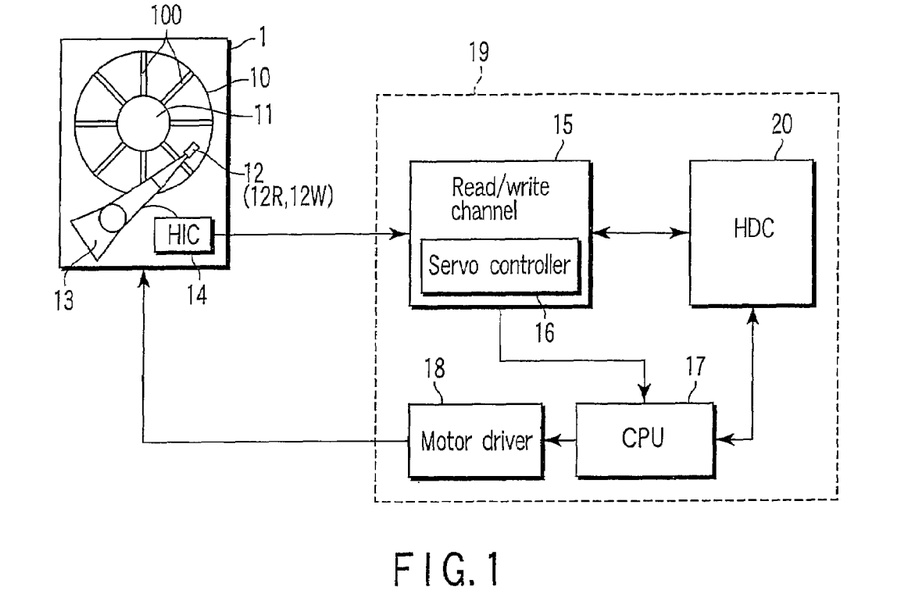
FIG. 1 is a block diagram showing an essential part of a disk drive in accordance with a first embodiment of the present invention.

According to the first embodiment, FIG. 1 shows is a block diagram showing an essential part of a disk drive in accordance with the present embodiment.

A disk drive 1 has a disk medium 10, a spindle motor 11, a head 12, an actuator 13, a head amplifier (head IC) 14, and a printed circuit board (PCB) 19.

Figure 2:
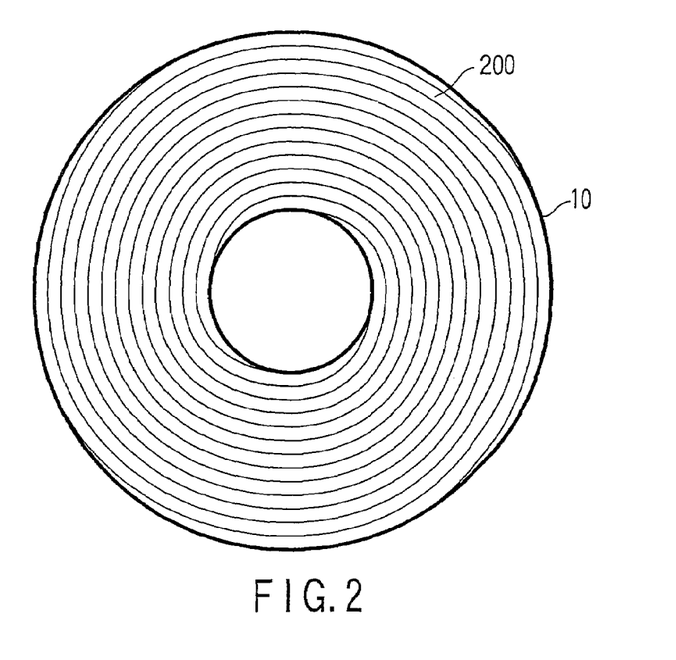
FIG. 2 is a diagram showing an example of spiral servo patterns in accordance with the present embodiment.

The disk medium 10 is rotated at a high speed by the spindle motor 11. In the present embodiment, spiral servo patterns are recorded on the disk medium 10 as base patterns by a spiral servo write process, as shown in FIG. 2.

The head 12 has a read head 12R and a write head 12W, and uses the read head 12R to read spiral servo patterns 200, a specified servo pattern, and user data from the disk medium 10. The head 12 uses the write head 12W to write user data to the disk medium in data regions different from servo sectors, and writes the specified servo pattern to the disk medium 10 during a servo self-write operation.

The actuator 13 is driven by a voice coil motor (VCM) to controllably move the mounted head 12 radially over the disk medium. The voice coil motor is controllably driven by a motor driver 18 mounted on PCB 19. The head amplifier 14 amplifies read signals read by the read head 12R and outputs the amplified read signals to a read/write channel (signal processing unit) 15 mounted on PCB 19.

The read/write channel 15, a microprocessor (CPU) 17, the motor driver 18, and a disk controller (HDC) 20 are mounted on PCB 19. The read/write channel 15 is a signal processing unit that processes read/write signals. The read/write channel 15 includes a servo controller 16 that executes a process of reproducing servo signals for the spiral servo patterns 200 and specified servo patterns 100.

The servo controller 16 includes an address code detector, a servo burst signal demodulator, and a servo data generator. The address code detector detects, in a read signal, address codes for a sector and a track (cylinder) contained in each of the specified servo patterns 100. The servo burst signal demodulator demodulates servo burst signals contained in spiral servo patterns 200 and specified servo patterns 100. The servo data generator generates position error data based on the address codes detected by the address code detector and servo burst signals (A to D) and outputs the data to CPU 17.

The motor driver 18 includes a VCM driver that supplies a drive current to the voice coil motor for the actuator 13 under the control of CPU 17 and an SPM driver that supplies a drive current to the spindle motor 11 under the control of CPU 17.

HDC 20 is an interface that performs, for example, data transfers between the disk drive 1 and an external host system. HDC 20 transfers user data output by the read/write channel 15 to the host system under the control of CPU 17. HDC 20 also receives data from the host system and transfers the data to the read/write channel 15. Data from the host system contains data on the specified servo patterns 100 to be written to the disk medium 10 by a servo self-write operation.

CPU 17 is a main controller for the disk drive 1 and has a function for performing a servo self-write operation in accordance with the present embodiment. In the disk drive 1 shipped as a product, CPU 17 controllably positions the head 12 on the basis of the specified servo patterns written to the disk medium 10.

(Servo Write Operation)

Description will be given below of the servo write operation in accordance with the present invention.

Figure 7A:
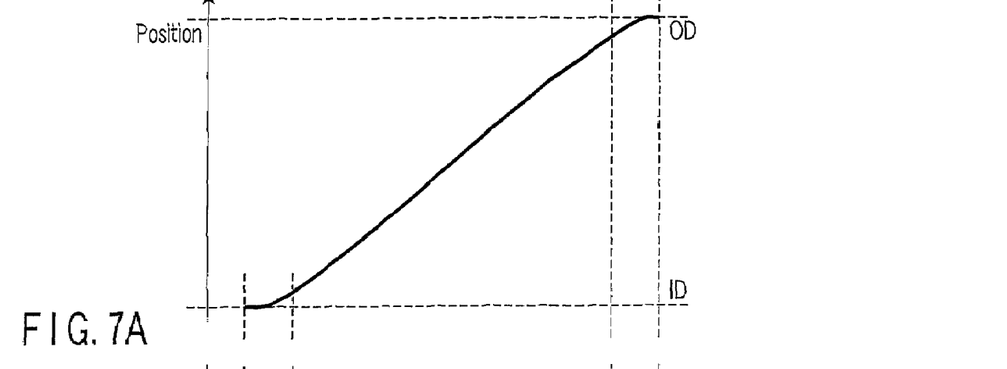
FIGS. 7A and 7B are diagrams illustrating a process of writing the spiral servo patterns to a disk medium in accordance with the present embodiment.
Figure 7B:
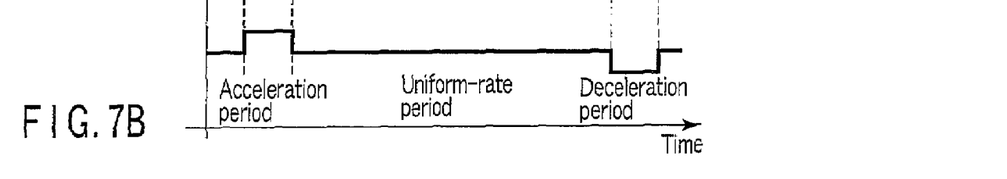

The servo write method in accordance with the present embodiment uses the disk drive 1, shown in FIG. 1, to record spiral servo patterns 200 on the disk medium 10 as base patterns (seed patterns). The spiral servo write operation writes one spiral servo pattern 200 shown in FIG. 2 from the inner periphery (ID) to outer periphery (OD) of the disk medium 10 during one full track seek operation as shown in FIG. 7A. FIG. 7B shows a process of seek control (speed control) performed on the head 12 by the servo controller 16 and CPU 17.

Figure 5:
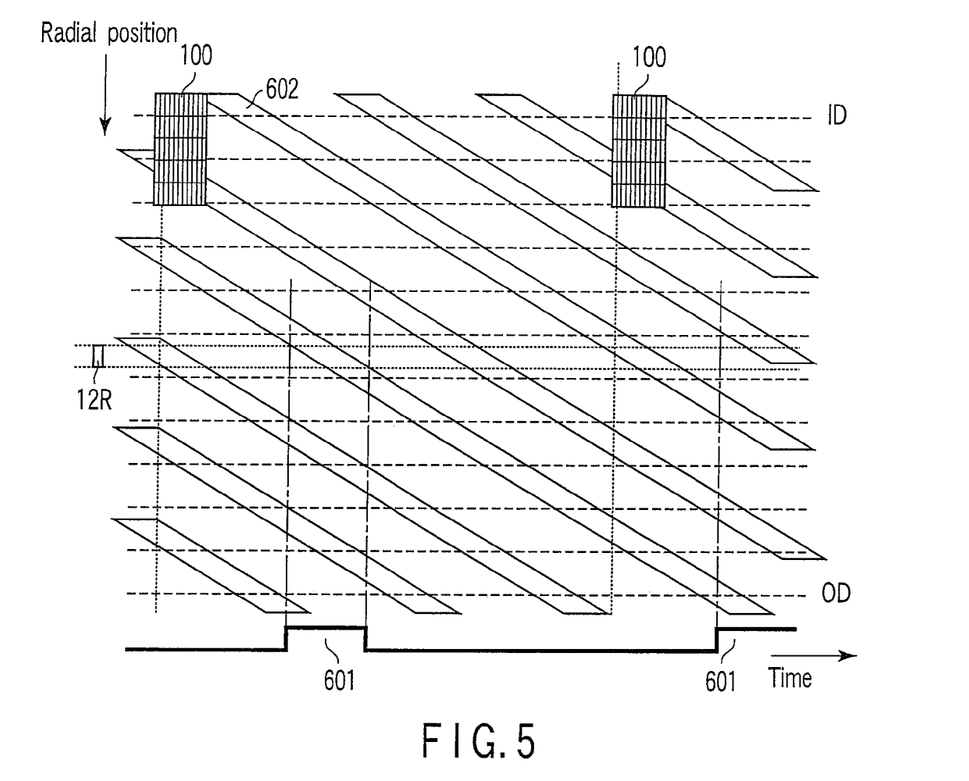
FIG. 5 is a diagram showing the configuration of the spiral servo patterns in accordance with the present embodiment.

As shown in FIG. 5, the spiral servo pattern 200 has a multi-spiral pattern configuration in which a plurality of spiral servo patterns 602 are arranged at equal intervals and parallel to one another. In FIG. 5, the abscissa indicates time, while the ordinate indicates a radial position on the disk medium 10.

Figure 6:
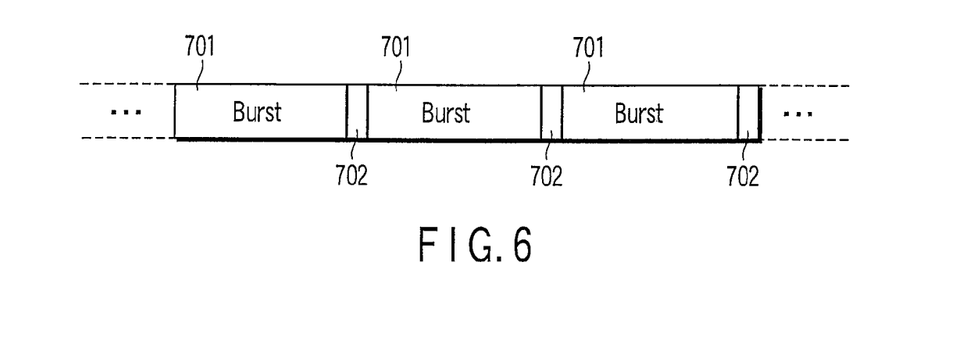
FIG. 6 is a diagram showing the format of the spiral servo pattern in accordance with the present embodiment.

As shown in FIG. 6, each of the spiral servo patterns 602 is composed as a servo burst signal 701 and a sync mark 702. Pairs each of the signals 701 and 702 are repeatedly arranged without any gap between the pairs.

As described below, the disk medium 10 built in the disk drive 1 on which the multi-spiral servo patterns are recorded by the method in accordance with the present embodiment. The disk drive itself performs to use prior art and this embodiment, on the disk medium 10, a servo self-write operation of writing concentric servo patterns (specified servo patterns 100) used for the product.

Figure 3:
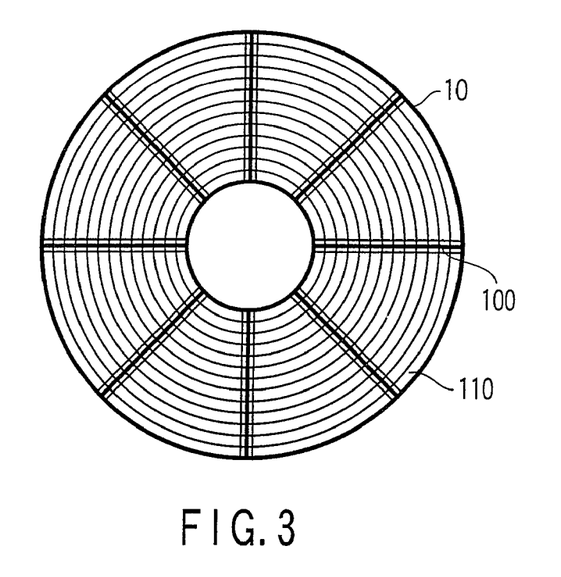
FIG. 3 is a diagram showing an example of concentric servo patterns in accordance with the present embodiment.

In the servo self-write operation, CPU 17 in the disk drive 1 positions the read head 12R (tracking) on the basis of the spiral servo patterns 602 as shown in FIG. 5 and writes the specified servo patterns 100, shown in FIG. 3, to the disk medium 10.

Figure 4:
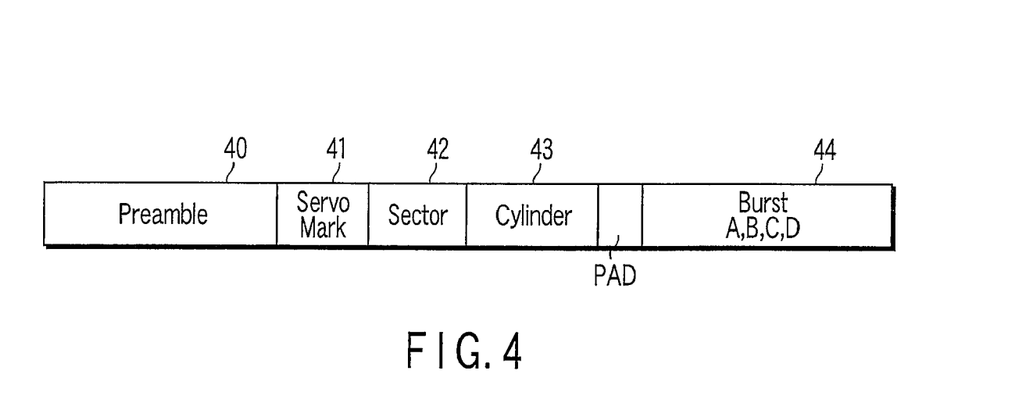
FIG. 4 is a diagram showing the format of the concentric servo pattern in accordance with the present embodiment.

Here, the specified servo patterns 100 are composed of servo data having such a format as shown in FIG. 4 and recorded for each servo sector. As shown in FIG. 3, the servo sectors are circumferentially arranged into servo tracks 110 having a predetermined radial interval.

As shown in FIG. 4, the servo sector includes a preamble 40, a servo mark 41, a sector address 42, a track (cylinder) address 43, a postamble, and servo burst signals (A, B, C, and D). The sector address 42 and the track address 43 are address codes identifying the corresponding servo sector and track (cylinder), respectively. The servo burst signal 44 is a position detection signal used to detect the position of the head 12 in the track.

(Method of Writing Spiral Servo Patterns to the Disk Medium)

Now, description will be given of a method of writing multi-spiral servo patterns to the disk medium in accordance with the present embodiment.

Figure 10A:
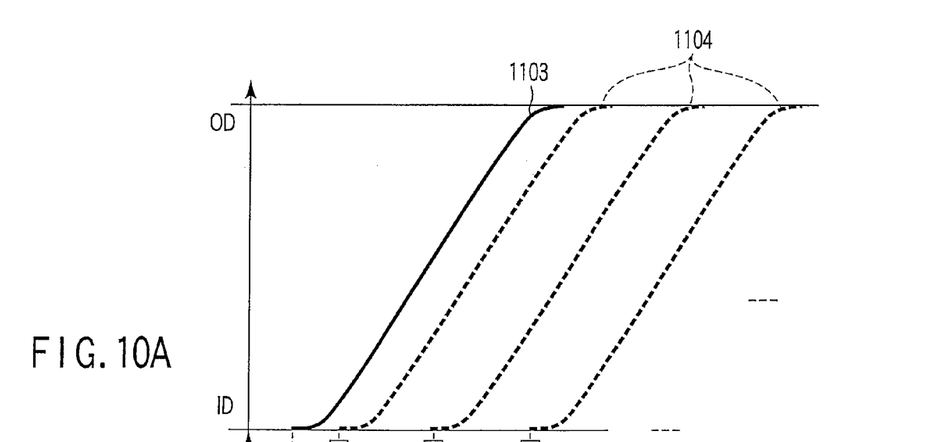
FIGS. 10A and 10B are diagrams illustrating the procedure of an operation of writing the spiral servo patterns to the disk medium using an index pattern in accordance with the present embodiment.

In the present embodiment, as shown in FIG. 10A, one index spiral pattern (hereinafter sometimes referred to as an index pattern) 1103 is written to the disk medium 10. The index pattern 1103 is used to generate a clock and a write start timing to allow a multi-spiral servo pattern 1104 to be written to the disk medium.

Figure 8:
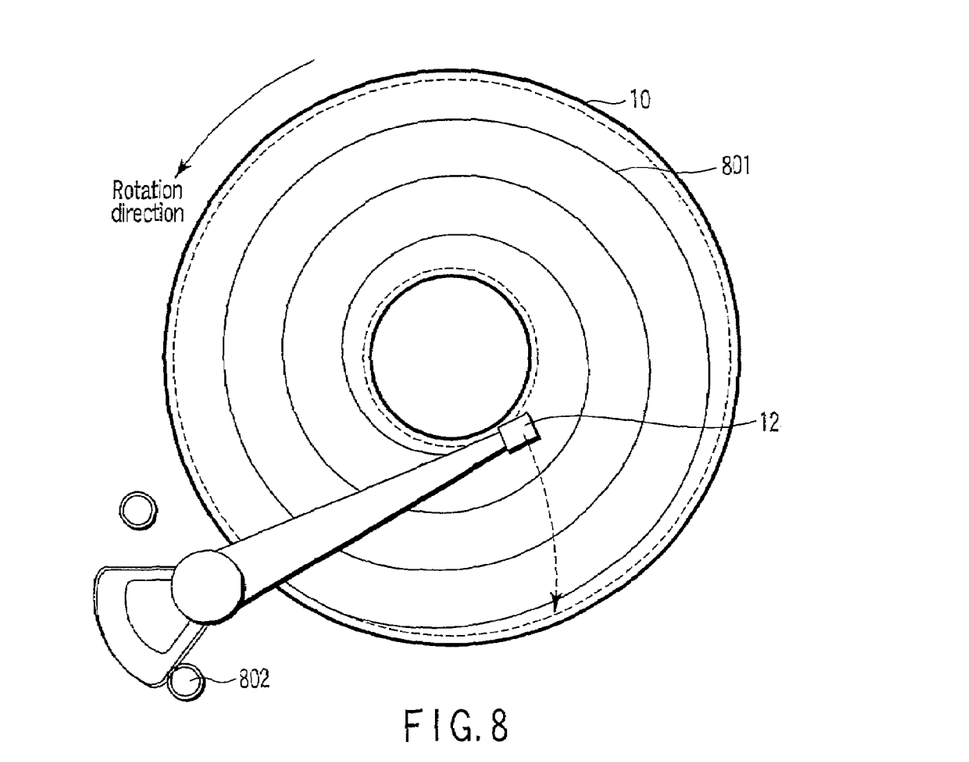
FIG. 8 is a diagram showing how one spiral pattern is written to the disk medium in accordance with the present embodiment.

FIG. 8 is a diagram showing how one spiral servo pattern 801 included in the multi-spiral servo pattern is written to the disk medium 10.

The spiral servo write operation moves the head 12 to the innermost periphery of the disk medium 10 and starts a full track seek operation at that position. Thus, the write head writes the spiral servo pattern configured as shown in FIG. 6 to the disk medium. That is, the spiral servo seek operation performs a seek operation with the actuator on which the head 12 is mounted, pressed against an inner peripheral stopper 802. The full track seek operation is performed by the seek control shown in FIGS. 7A and 7B as described above.

Figure 9:
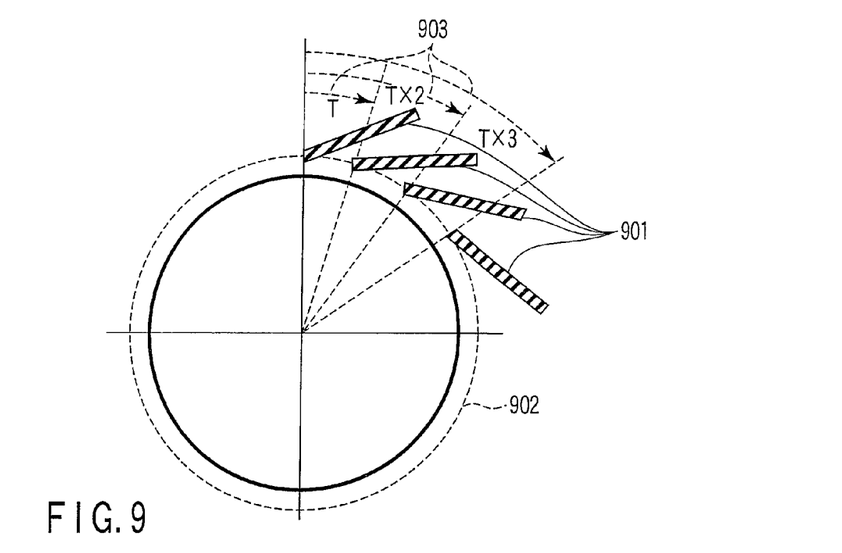
FIG. 9 is a conceptual drawing illustrating the procedure of an operation of writing the spiral servo patterns to the disk medium in accordance with the present embodiment.
Figure 10B:
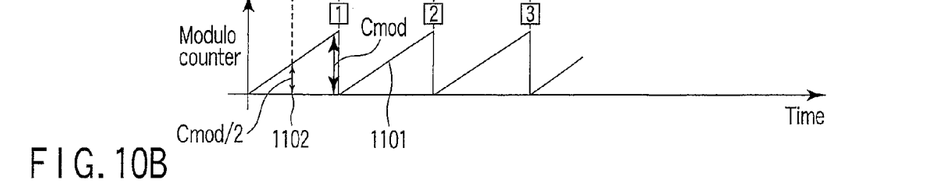
Figure 11:
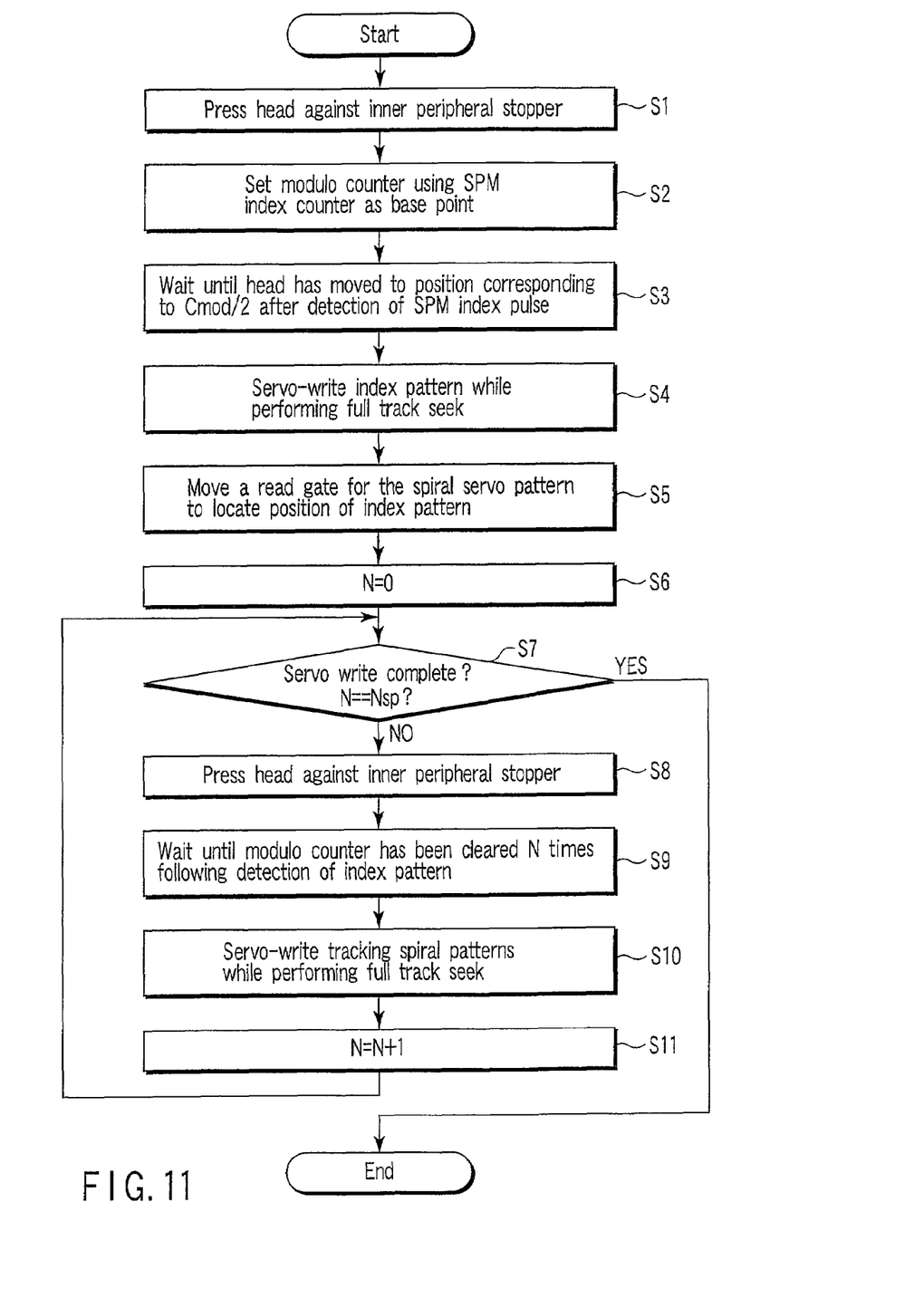
FIG. 11 is a flowchart illustrating the procedure of an operation of writing the spiral servo patterns to the disk medium in accordance with the present embodiment.

With reference to FIGS. 9 to 11, description will be given below of the procedure of the operation of writing the spiral servo patterns to the disk medium in accordance with the present embodiment.

FIG. 9 is a diagram showing the spiral servo write operation in which the write head 12W of the head 12 sequentially writes spiral servo patterns 901 at a fixed interval 903 from an innermost peripheral position 902 on the disk medium 10. With reference to a flowchart in FIG. 11, a specific description will be given of the procedure of the operation of writing the spiral servo patterns to the disk medium.

The spiral servo write operation loads the head 12 on the disk medium 10 and passes current through VCM so as to press the actuator against the inner peripheral stopper 802. The head 12 is thus fixed in the innermost peripheral position 902 (Block S1).

Here, the first start position of the full track seek operation is determined using an index pulse generated every time a spindle motor 34 makes one rotation. CPU 17 sets a counter that counts the seek start position, using the index pulse as a base point (Block S2). The counter is a modulo counter that outputs such a count value 1101 as shown in FIG. 10B. Here, the number of required spiral servo patterns is defined as Nsp. The number of count up the counter during the time in which the spindle motor makes one rotation is defined as Cr. Then, the modulo counter is set to return to zero when the count reaches the value Cmod (Cmod=Cr/Nsp).

In the spiral servo write operation, upon detection of the index pulse generated in response to the rotation of the spindle motor, a seek operation is started at a position 1102 where the modulo counter reaches the count value (Cmod/2), as shown in FIGS. 10A and 10B (Block S3). The modulo counter is set at zero every time the index pulse is detected.

The first seek operation sets the one spiral pattern written to the disk medium 10 by the write head 12W of the head 12 to be an index pattern 1103 (Block S4). The index pattern 1103 has a format similar to that of each servo pattern of the multi-spiral servo pattern 1104. The index pattern 1103 is thus composed of the servo burst signal 701 and the sync mark 702 as shown in FIG. 6. However, an index mark (SIM) serving to distinguish the index pattern 1103 from the multi-spiral servo pattern 1104 is recorded as the sync mark 702. The modulo counter desirably synchronizes with the clock according to which the spiral patterns are generated.

The spiral servo write operation then uses the read head 12R of the head 12 to search the disk medium for the position of the index pattern recorded on the disk medium 10 (Block S5)

A specific searching method is as follows. The index pattern 1103 is written to the disk medium by the time when the modulo counter finishes one cycle (from zero to Cmod) using the index pulse as the base point. With the actuator pressed against the inner peripheral stopper, a read gate (servo gate) for the spiral servo patterns is moved until the modulo counter finishes one cycle on the basis of the index pulse. That is, a gate position is searched for where a position with the maximum signal amplitude output from the read head 12R of the head 12 aligns with the center of the read gate. The sync mark (SIM) can be retrieved from the index pattern 1103 in accordance with the signal read by the read head.

CPU 17 uses the count value in the modulo counter obtained when the sync mark (SIM) is detected to fine-tune a reference clock for the modulo counter. That is, fine-tuning is performed so that the count value in the modulo counter obtained when the sync mark (SIM) is read reaches "Cmod/2" every time the disk medium 1 makes one rotation.

Then, the spiral servo write operation shifts to a process of writing the multi-spiral servo pattern 1104 to the disk medium on the basis of the index pattern 1103, as shown in FIG. 10A (Block S8 to S10). The multi-spiral servo pattern 1104 is the base pattern used for the tracking operation of the head 12 when the disk drive 1 performs the servo self-write operation to write the concentric servo patterns 100 to the disk medium.

Specifically, as is the case with the index pattern 1103, the spiral servo write operation fixes the head 12 to the innermost peripheral position 902 by passing current through VCM so as to press the actuator against the inner peripheral stopper 802 (Block SB). In this state, the operation waits until the full track seek start position is detected (Block S9).

That is, when the Nth spiral servo pattern 1104 is written to the disk medium, the sync mark 701 written to the disk medium during a full track seek operation is a pattern (hereinafter referred to as SAM) different from the sync mark SIM in the index pattern 1103. On the other hand, a seek operation performed when the spiral servo pattern 1104 is written to the disk medium is started when the Nth (modulo counter set to zero) reset operation following the detection of the index pattern 1103 is performed on the modulo counter.

Under this control, the spiral servo write operation repeats the processing in Blocks S8 to S10 Nsp times on the basis of the index pattern 1103 to write the multi-spiral servo pattern 1104 all over the surface of the disk medium 10.

As described above, according to the present embodiment, when the multi-spiral servo pattern is written to the disk medium 10 as a base pattern (seed pattern), the index pattern 1103, which is a spiral servo pattern, is written to the disk medium 10. The operation of writing the multi-spiral servo pattern to the disk medium is started on the basis of the index pattern 1103.

The index pattern 1103 is a spiral servo pattern and thus has a radial range on the disk medium 10. Thus, even if the head 12 has an offset between the read head and the write head, the read head can easily read the index pattern 1103 without the need to take the offset into account.

In other words, the time required to read the index pattern 1103 from the disk medium is shorter than that required for the read head 12R to search for the conventional clock track. This enables a start timing for the operation of writing the multi-spiral servo pattern to the disk medium to be generated in a short time.

When the disk drive 1 as a product performs a servo self-write operation, CPU 17 detects the sync mark SAM to allow the head 12 to perform a tracking operation (to position the head 12) using the multi-spiral servo pattern 1104. That is, CPU 17 identifies the index pattern 1103 on the basis of the sync mark SIM and avoids using the index pattern 1103 for the tracking operation of the head 12.

Second Embodiment

Figure 12A:
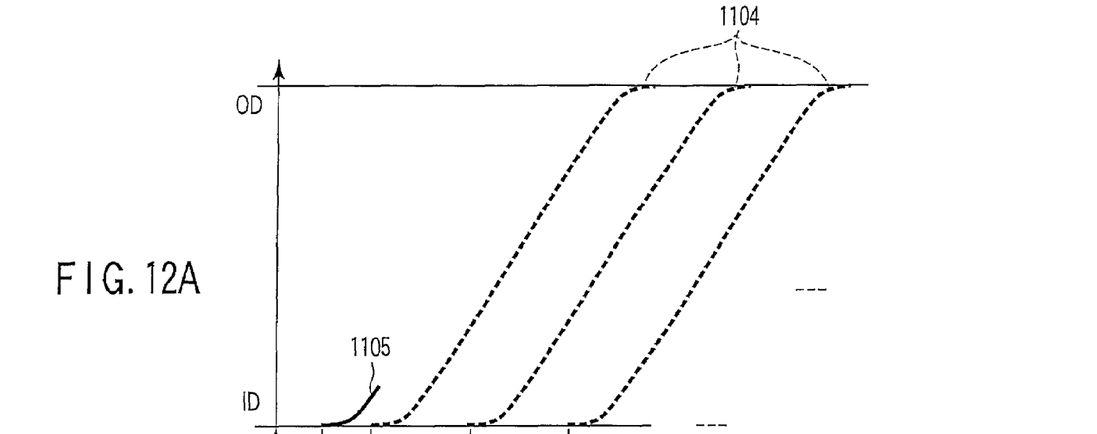
FIGS. 12A and 12B are conceptual drawings illustrating the procedure of an operation of writing the spiral servo patterns to the disk medium in accordance with a second embodiment.
Figure 12B:
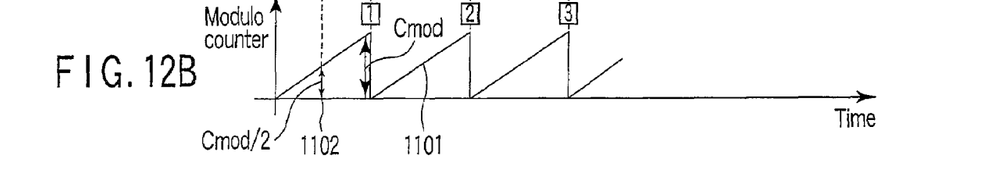

FIGS. 12A and 12B are diagrams illustrating the procedure of the operation of writing the spiral servo patterns to the disk medium in accordance with a second embodiment.

As shown in FIG. 12A, the present embodiment is a method of writing an index pattern 1105 shorter than each of the spiral servo patterns 1104 of the multi-spiral servo pattern 1105, to the disk medium. The index pattern 1105 has the same format as that of the index pattern 1103 except for the length of the index pattern. That is, the sync mark SIM for the index pattern 1103 is also recorded as the sync mark 701 for the index pattern 1105.

This method enables a reduction in the possibility that the servo track writer or the disk drive mistakes the index pattern 1105 for the multi-spiral servo pattern 1104. The configuration of the disk drive, the procedure of writing the multi-spiral servo pattern to the disk medium, and the servo self-write operation are similar to those in the first embodiment described with reference to FIGS. 1 to 11 and will thus not described below.

Third Embodiment

Figure 13A:
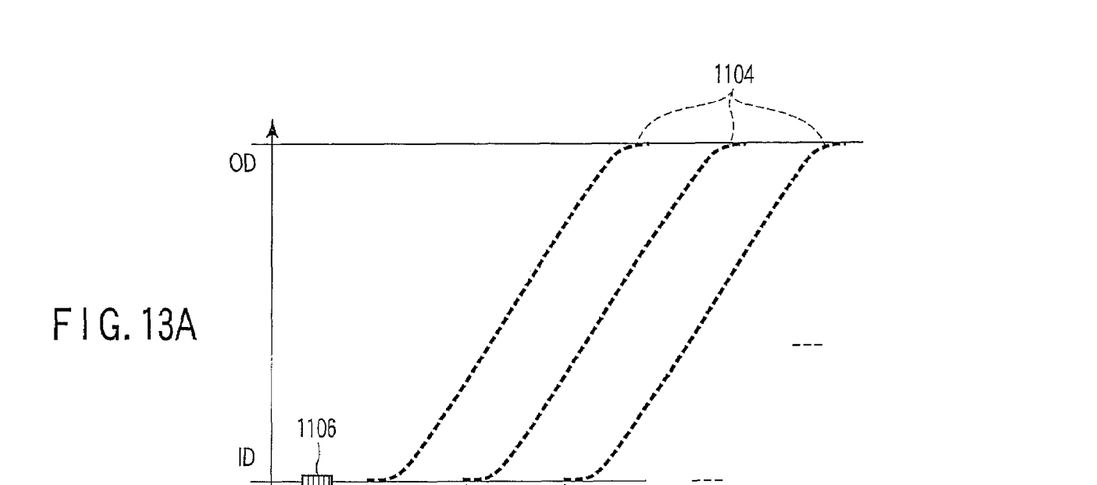
FIGS. 13A and 13B are conceptual drawings illustrating the procedure of an operation of writing the spiral servo patterns to the disk medium in accordance with a third embodiment.
Figure 13B:
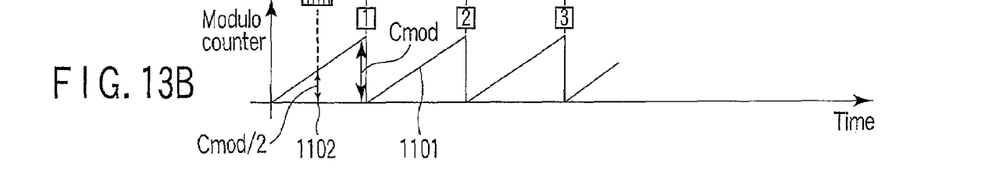

FIGS. 13A and 13B are diagrams illustrating the procedure of the operation of writing the spiral servo patterns to the disk medium in accordance with a third embodiment.

The present embodiment is a method of writing an index pattern 1106 similar to the concentric servo pattern 100, shown in FIG. 4, as shown in FIG. 13A. In the present embodiment, detection of the index pattern 1106 requires a pattern searching process as is the case of the conventional clock track (see U.S. Pat. No. 5,668,679). However, the present embodiment requires only the index position to be searched for, reducing the search time compared to the use of the clock track.

Furthermore, the index pattern 1106 has a configuration similar to that of the concentric servo pattern 100, finally written to the disk medium by the servo self-write operation performed by the disk drive 1. This allows the read/write channel 15, incorporated in the disk drive 1, to be utilized to reproduce the index pattern 1106. That is, specifically, the index pattern 1106 can be utilized for a frequency draw-in operation based on the preamble or an automatic gain control (AGC) operation. Further, whether or not the index pattern 1106 is effective can be easily determined by utilizing the read/write channel 15, incorporated in the disk drive 1.

The configuration of the disk drive, the procedure of writing the multi-spiral servo pattern to the disk medium, and the servo self-write operation are similar to those in the first embodiment described with reference to FIGS. 1 to 11 and will thus not described below.

According to the embodiments, a write start timing for spiral servo patterns may be generated on the basis of the spiral index pattern. This enables a reduction in processing time required to detect a reference pattern for determining the write start timing for the spiral servo patterns.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of using a head to write spiral servo patterns used to control positioning of the head, to a disk medium used for a disk drive, the method comprising:

a first write process of writing a spiral index pattern to the disk medium, the spiral index pattern being a spiral pattern including the same region as that of a servo burst signal included in each of the spiral servo patterns and a region that allows the spiral index pattern to be distinguished from the spiral servo patterns; and a second write process of writing the spiral servo patterns to the disk medium at equal intervals in a circumferential direction using the spiral index pattern as a reference, wherein the first write process writes the spiral index pattern comprising a spiral pattern shorter than the spiral servo pattern, to the disk medium.

2. The method according to claim 1, wherein the spiral servo pattern includes a region of a sync mark adjacent to the region of the servo burst signal, and the first write process writes a pattern different from the sync mark to a region corresponding to the region of the sync mark included in the spiral index pattern.

3. The method according to claim 1, wherein the first write process writes the spiral index pattern to the disk medium in synchronism with an index pulse generated every time the disk drive makes one rotation, with the head positioned on an innermost periphery of the disk medium.

4. A disk drive comprising:

a head which reads and writes data;

a disk medium on which spiral servo patterns and a spiral index pattern are recorded, the spiral servo patterns each including a region of a servo burst signal and a region of a sync mark adjacent to the region of the servo burst signal, the spiral index pattern including the region of the servo burst signal and the region of the sync mark in which a pattern different from that of the spiral servo pattern is recorded, the spiral index pattern being used as a write reference for the spiral servo patterns and comprising a spiral pattern shorter than the spiral servo pattern;

a head moving unit which moves the head radially over the disk medium; and a servo write unit which controls the head moving mechanism on the basis of the spiral servo patterns read by the head, to place the head at a specified position and which writes specified servo patterns for head positioning control to the disk medium.

5. The disk drive according to claim 4, wherein the spiral servo patterns are a multi-spiral servo pattern comprising a plurality of spiral servo patterns, and the spiral index pattern is a single spiral servo pattern.

6. A method of using a head to write spiral servo patterns used to control positioning of the head, to a disk medium used for a disk drive, the method comprising:

a first write process of writing a spiral index pattern to the disk medium, the spiral index pattern being a spiral pattern including the same region as that of a servo burst signal included in each of the spiral servo patterns; and a second write process of writing the spiral servo patterns to the disk medium at equal intervals in a circumferential direction using the spiral index pattern as a reference, wherein the first write process writes the spiral index pattern comprising a spiral pattern shorter than the spiral servo pattern, to the disk medium.

\* \* \* \* \*